(12) United States Patent
Alvarez Dominguez et al.

(10) Patent No.: US 11,533,546 B2
(45) Date of Patent: Dec. 20, 2022

(54) MULTIPATH POLICY DECISIONS FOR ENCRYPTED VIDEO STREAMS

(71) Applicant: Telefonaktiebolaget LM Ericsson (publ), Stockholm (SE)

(72) Inventors: Rodrigo Alvarez Dominguez, Madrid (ES); Carlos Jimenez Cordon, Madrid (ES); Marc Molla, Madrid (ES); Miguel Angel Muñoz De La Torre Alonso, Madrid (ES); Miguel Angel Puente Pestaña, Madrid (ES); Carlota Villasante, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/762,864

(22) PCT Filed: Dec. 6, 2017

(86) PCT No.: PCT/EP2017/081660
§ 371 (c)(1),
(2) Date: May 8, 2020

(87) PCT Pub. No.: WO2019/091591
PCT Pub. Date: May 16, 2019

(65) Prior Publication Data
US 2020/0288212 A1     Sep. 10, 2020

(30) Foreign Application Priority Data
Nov. 10, 2017  (EP) .................................... 17382761

(51) Int. Cl.
*H04N 21/647*     (2011.01)
*H04L 45/00*      (2022.01)
(Continued)

(52) U.S. Cl.
CPC ....... *H04N 21/64746* (2013.01); *H04L 45/22* (2013.01); *H04L 45/24* (2013.01);
(Continued)

(58) Field of Classification Search
CPC ......... H04N 21/64746; H04N 21/2347; H04N 21/8456; H04L 45/22; H04L 45/24; H04L 65/80
See application file for complete search history.

(56) References Cited

U.S. PATENT DOCUMENTS

| 8,743,954 B1* | 6/2014 | Masterson | ........... H04N 19/124 375/240.05 |
| 2013/0083843 A1* | 4/2013 | Bennett | ................ H04N 19/156 375/240.02 |

(Continued)

FOREIGN PATENT DOCUMENTS

CN          105490933 A      4/2016

OTHER PUBLICATIONS

International Search Report and the Written Opinion of the International Searching Authority, issued in corresponding International Application No. PCT/EP2017/081660, dated Jul. 26, 2018, 11 pages.

(Continued)

*Primary Examiner* — Randy A Flynn
(74) *Attorney, Agent, or Firm* — Rothwell, Figg, Ernst & Manbeck, P.C.

(57) ABSTRACT

The invention relates to a method, for controlling at least one path in a multipath environment by a path control entity, wherein the at least one one path is used for transmitting an encrypted video stream comprising a sequence of video segments. The method comprises the following steps: estimating a resolution used in the video stream based on the video segments, and determining that the resolution used in (Continued)

the video stream has changed during the transmission. When it is determined that the resolution used in the video stream has changed, an adaptation of a number of the at least one path used for transmitting the video stream in the multipath configuration is initiated based on the determined change of the resolution.

20 Claims, 13 Drawing Sheets

(51) Int. Cl.
    *H04L 45/24*     (2022.01)
    *H04L 65/80*     (2022.01)
    *H04N 21/2347*     (2011.01)
    *H04N 21/845*     (2011.01)

(52) U.S. Cl.
    CPC ......... *H04L 65/80* (2013.01); *H04N 21/2347* (2013.01); *H04N 21/8456* (2013.01)

(56) References Cited

U.S. PATENT DOCUMENTS

| | | | |
|---|---|---|---|
| 2015/0319076 A1* | 11/2015 | Vasseur | H04L 43/0852 370/238 |
| 2015/0381455 A1* | 12/2015 | Martinsen | H04L 65/608 370/252 |
| 2016/0286251 A1* | 9/2016 | Kopka | H04N 21/2402 |
| 2017/0230698 A1* | 8/2017 | Gilboy | H04N 21/6143 |
| 2017/0346724 A1* | 11/2017 | Calin | H04L 45/24 |
| 2018/0109579 A1* | 4/2018 | Salgueiro | H04L 65/607 |
| 2018/0167436 A1* | 6/2018 | Han | H04L 65/604 |
| 2018/0359301 A1* | 12/2018 | Zhao | H04N 21/8456 |

OTHER PUBLICATIONS

Chen et al. "MSPlayer: Multi-Source and Multi-Path Video Streaming" IEEE Journal on Selected Areas in Communications, Aug. 1, 2016 IEEE Service Center, Piscataway, US, vol. 34,No. 8, pp. 2198-2206.
Lim et al. "ECF: An MPTCP Path Scheduler to Manage Heterogeneous Paths", SIGMETRICS' 17, Jun. 5-9, 2017, pp. 33-34.
Broadband Forum, Technical Report, "TR-348 Hybrid Access Broadband Network Architecture" Issue 1, Jul. 2016, 49 pages.
ETSI Technical Report, "Speech and multimedia Transmission Quality (STQ); QoS aspects of TCP-based video services like YouTube™" ETSI TR 101 578 V1.1.1 (Dec. 2013), 25 pages.
Broadband Forum, Technical Report, "TR-300 Policy Convergence for Next Generation Fixed and 3GPP Wireless Networks" Issue 1, Sep. 2014, 39 pages.

* cited by examiner

Fig. 6

| 144p | | 240p | | 360p | | 480p | | 720p | |
|---|---|---|---|---|---|---|---|---|---|
| ANDROID | IOS | ANDROID | IOS | ANDROID | IOS | ANDROID | IOS | ANDROID | IOS |
| 1169,344 | 682,136 | 2615,352 | 1478,496 | 2760,096 | 3194,24 | 5597,008 | 4928,728 | 2652,92 | 3314,432 |
| 1168,864 | 682,136 | 2615,352 | 1502,112 | 3022,632 | 3311,992 | 3810,232 | 4929,176 | 2781,92 | 4488,808 |
| 1168,888 | 682,136 | 2615,352 | 1478,048 | 3416,432 | 3301,448 | 4077,256 | 5339,04 | 18693,352 | 3430,336 |
| 1168,312 | 682,136 | 2615,352 | 1502,112 | 3678,96 | 3301,696 | 3677,456 | 6207,336 | 2193,384 | 4228,104 |
| 1168,728 | 682,136 | 2615,352 | 1502,112 | 3416,432 | 2660,848 | 3022,64 | 5073,304 | 2365,072 | 4467,632 |
| 1169,968 | 682,136 | 2615,352 | 1502,112 | 3285,168 | 1936,488 | 3416,44 | 5314,776 | 3022,656 | 6696,28 |
| 1169,912 | 682,136 | 2615,352 | 1478,048 | 3030,144 | 2105,128 | 3285,176 | 4832,28 | 3568,568 | 7352,72 |
| 1169,232 | 682,136 | 2615,352 | 1502,112 | 2891,376 | 2154,096 | 3612,488 | 4872,952 | 2641,24 | 6896,584 |
| 1169,52 | 682,136 | 2615,352 | 1478,048 | 3338,28 | 2129,832 | 4160,424 | 5049,688 | 4422,2 | 12191,624 |
| 1169,224 | 682,136 | 2615,352 | 1502,112 | 3547,696 | 2178,16 | 4335,28 | 2877,624 | 2112,744 | 7920,768 |
| 1168,872 | 682,136 | 2615,352 | 1478,048 | 3547,696 | 2250,544 | 3285,176 | 2853,56 | 3675,784 | 4026,68 |
| 1169,152 | 682,136 | 2615,352 | 1478,048 | 4558,28 | 2250,544 | 3806,656 | 2853,56 | 2760,128 | 6702,272 |
| 1169,52 | 682,136 | 2615,352 | 1502,112 | 5255,832 | 3038,92 | 3233,192 | 4204,36 | 2869,664 | 5453,056 |
| 1169,032 | 682,136 | 2615,352 | 1501,912 | 5056,296 | 1743,784 | 3828,712 | 4711,76 | 3810,24 | 5188,416 |
| 1169,832 | 682,768 | 2615,352 | 1478,048 | 3746,552 | 1429,728 | 4072,76 | 4035,72 | 5253,016 | 7390,632 |
| 1168,848 | 682,136 | 2615,352 | 1502,112 | 2460,056 | 2130,024 | 3941,496 | 3528,96 | 4117,464 | 7069,936 |
| 1168,832 | 682,136 | 2615,352 | 1502,112 | 4526,864 | 2346,8 | 4246,944 | 3601,344 | 1995,28 | 4620,048 |
| 1169,384 | 682,136 | 2615,352 | 1478,048 | 3853,24 | 2081,704 | 4142,912 | 3336,256 | 2171,112 | 5363,648 |
| 1168,936 | 682,136 | 2615,352 | 1502,112 | 3478,728 | 2443,248 | 4519,448 | 3746,56 | 2891,392 | 4514,776 |
| 1168,936 | 682,136 | 2615,352 | 1502,112 | 4735,368 | 2346,8 | 4204,024 | 5483,616 | 3087,888 | 5645,304 |
| 1168,84 | 682,136 | 2615,352 | 1478,048 | 4531,464 | 2733,048 | 3678,96 | 1190,192 | 2103,808 | 4752,704 |
| 1168,2 | 682,136 | 2615,352 | 1502,112 | 3099,632 | 3142,712 | 3678,96 | 4631,536 | 3153,92 | 6197,528 |
| 1169,208 | 682,136 | 2615,352 | 1502,112 | 2751,944 | 2322,736 | 3769,816 | 2853,56 | 3106,192 | 4602,208 |
| 1168,8 | 657,88 | 2615,352 | 1502,112 | 3068,984 | 2587,824 | 4335,288 | 3312,64 | 3285,184 | 4749,944 |
| 1169,64 | 682,136 | 2615,352 | 1502,112 | 4072,752 | 2202,216 | 3934,792 | 3070,52 | 5122,88 | 4264,656 |
| 1169,384 | 682,136 | 2615,352 | 1478,048 | 3153,904 | 1405,664 | 3272,16 | 2853,56 | 3620,432 | 5645,304 |
| 1169,696 | 682,136 | 2615,352 | 1502,112 | 3285,168 | 1550,24 | 3022,64 | 2805,432 | 4490,424 | 4752,704 |
| 1169,064 | 682,136 | 2615,352 | 1478,048 | 3713,04 | 3167,432 | 3275,456 | 3770,632 | 4597,824 | 6197,528 |
| 1168,416 | 682,136 | 2615,352 | 1502,112 | 3416,432 | | 3547,704 | | 22900,808 | 4602,208 |
| 1168,456 | 682,136 | 2615,352 | 1478,048 | 3022,64 | | 3708,256 | | 2497,024 | 4749,944 |
| 1169,184 | 682,136 | 2615,352 | 1478,048 | 3022,64 | | 11836,568 | | 5693,896 | 4264,656 |
| 1169,424 | 682,136 | 2615,352 | 1502,112 | 3022,64 | | 11069,52 | | 2604,776 | 4103,2 |
| 1169,36 | 682,136 | 2615,352 | 1478,048 | 3941,488 | | 3153,912 | | 2343,936 | 4706,424 |
| 1169,216 | 682,136 | 2615,352 | 1502,112 | 3941,488 | | 2891,384 | | 2235,088 | 3302,368 |
| 1169,632 | 682,136 | 2615,352 | 1478,048 | 3285,168 | | 4335,28 | | 2637,104 | |
| 1169,704 | 682,136 | 2615,352 | 1478,496 | 3022,64 | | 3270,912 | | 3400,344 | |
| 1169,448 | 682,136 | 2615,352 | 1502,112 | 3153,904 | | 3277,504 | | 2366,352 | |
| 1169,528 | | | | 2203,024 | | 4991,608 | | 4595,464 | |

MULTIPATH POLICY DECISIONS FOR ENCRYPTED VIDEO STREAMS

CROSS REFERENCE TO RELATED APPLICATION(S)

This application is a 35 U.S.C. § 371 National Phase Entry Application from PCT/EP2017/081660, filed Dec. 6, 2017, designating the United States, and also claims the benefit of European Application No. 17382761.9, filed Nov. 10, 2017, the disclosures of which are incorporated herein by reference in their entirety.

TECHNICAL FIELD

The application relates to a method for controlling at least one path in a multipath environment wherein the at least one path is used for transmitting an encrypted video stream comprising a sequence of video segments. Furthermore the corresponding path control entity is provided which controls the at least one path in the multipath environment. Additionally a computer program comprising programme code is provided and a carrier comprising the computer program.

BACKGROUND

The streaming of a video based on TCP (Transport Control Protocol) comprises different phases as shown in FIG. 1. A pre-download phase 2 is provided and a download phase 3. The former phase comprises a streaming access phase 4 wherein the latter phase comprises a buffering phase 5 which starts with the first transfer of the video and which ends when the first frame of the video is displayed. The different phases shown in FIG. 1 can occur during a download of a video from a provider such as YouTube. The buffering occurs when there is not enough information in the video buffer of the player so that the end user cannot visualise the video.

The video session then starts with a playout phase 6 where the end user is playing the video and where the video is still downloaded. In Netflix and YouTube, once the additional buffering has finished, the end-user periodically downloads some video frames to keep the buffer state over a minimum needed for still reproducing the video. These video services use TCP as transport protocol. The payload of the traffic is sent using encryption mechanisms.

Adaptive bit rate (ABR) is the most common technology used to deliver video by over-the-top (OTT) video providers using HTTP/HTTPS over TCP.

With this technology, any video can be reproduced at different resolution levels (144p, 240p, 360p, 480p, 720p, . . . ), called video representations. 144p means that the video frame has 144 lines and 244p means that each video frame has 244 lines per video frame. For the same client, higher resolution level implies better video quality reproduction so both terms (video resolution and video quality reproduction) are connected. In the following the terms video quality, video resolution, resolution of a video stream, and resolution used in a video stream are used interchangeably.

The client can decide the resolution of the video reproduction, based on client properties and network conditions. FIG. 2 shows an example of a web server 20 in which a video is stored with different possible resolutions. Moreover, while video is under reproduction on a client 30, the client can change the video quality on the fly, pursuing adaptation to bandwidth fluctuations as shown by the different gray scales of the transmitted video stream.

Each video stream is fragmented into small chunks called video segments. When a client is requesting more video payload from the server one video segment is the minimum video payload that has to be downloaded. The video stream has several video frames per second and a video segment comprises video content for several seconds.

With higher resolution, the client increases the video perception so this means that the QoE is improved. QoE, according to Wikipedia is the degree of delight or annoyance of the user of an application or service. QoE has historically emerged from QoS), which attempts to objectively measure service parameters QoS measurement is most of the time not related to a customer, but to the media or network itself.

Hybrid Access technology is the way network operators offer the combined usage of fixed broadband and 3GPP access networks. In *TR-348 Hybrid Access Broadband Network Architecture* the architectural requirements to allow coordinated and, when needed, simultaneous use of fixed broadband access and 3GPP access networks for converged operators is specified, enabling further Fixed-Mobile Convergence (FMC) use cases.

As it is explained in *TR-348 Hybrid Access Broadband Network Architecture*, there are several solutions that may be used to transport traffic between a HCPE (Hybrid Customer Premises Equipment) and HAG (Hybrid Access Gateway) in Hybrid Access broadband networks. The main objective is faster service turn-up for new subscribers, increased access reliability and enabling higher throughput for subscribers.

There are different options to transport traffic between the HCPE and HAG in Hybrid Access broadband networks, one of them being the L4 Multipath. The connectivity between the HCPE and the HAG is established using a Layer 4 multipath transport service, enabling L4 (layer4) flows to use multiple paths in the Hybrid Access path group simultaneously. As an example, a L4 multipath implementation using MPTCP sets up multiple TCP sub-flows over the different access networks and utilizes real time HCPE to HAG flow control. The HCPE and HAG are responsible for managing the MPTCP (Multipath TCP) paths, including establishment and tear down.

FIG. 3 describes how this process works. In a first step S 31 the capabilities of the involved entities are exchanged. In step S 32 the hybrid access Gateway is informed of the capabilities such as deep packet inspection (DPI) and multipath. In step S33 the policy server generates the connections to the customer premises equipment (CPE) and in step S34 the connections are established between the policy server and the hybrid access Gateway. In step 35 the DSL leg is established between the hybrid access Gateway, HAG, and the customer premises equipment.

The implementation itself is access network agnostic, therefore no changes at either the fixed broadband or the 3GPP access networks are necessary.

The HCPE and HAG terminate the end user layer 4 sessions before transporting the data over the Hybrid Access paths, effectively executing a proxy function for the end user sessions.

There are several steering policies proposed:
Route all user traffic through one leg (e.g. Fixed) and only when overload route it through the other leg/s (e.g. 3GPP access)
Route the traffic for one service (e.g. Netflix) through one leg (e.g. Fixed) and only when overload route it through the other leg/s (e.g. 3GPP access)
Route all user traffic through all legs (carrier aggregation Use Case, i.e. to increase the bandwidth)

Route the traffic for one service (e.g. Netflix) through all legs (carrier aggregation Use Case, i.e. to increase the bandwidth)

Block the traffic for one leg (e.g. to prioritize the other leg/s)

Throttle (bandwidth limitation) the traffic for one leg (e.g. to prioritize the other leg/s)

Select the best leg based on link behavior and characteristics (e.g. RTT, Packet loss).

In the multipath environment policies are applied taking into account how much congestion exists in each of the path or a priority of each path, e.g. which is the cheaper path for the user.

In the above discussed hybrid scenario it is furthermore possible that the path is opened as soon as it is available. This can mean that both paths, the DSL and LTE path are opened at the beginning. However there may exist scenarios where both paths are not needed at the same time for transmitting a video to a user.

Accordingly a need exists to improve the selection of a path in a multipath environment for transmitting encrypted video streams.

SUMMARY

This need is met by the features of the independent claims. In the dependent claims further embodiments are disclosed.

According to a first aspect a method for controlling at least one path in a multipath environment is provided by a path control entity, wherein the at least one path is used for transmitting an encrypted video stream comprising a sequence of video segments. According to one step, a resolution used in the video stream is estimated based on the video segments. Furthermore, it is determined that the resolution used in the video stream has changed during the transmission. When it is determined that the resolution used in the video stream has changed, an adaptation of a number of the at least one path used for transmitting the video stream in the multipath configuration is initiated based on the determined change of the resolution.

In an encrypted video the resolution of the media stream can be estimated based on the video segments of the media stream, e.g. based on the size of the video segments. When the resolution changes, this can mean that the resolution is increased or that the resolution is decreased. When the resolution decreases it can mean that the Quality of experience for the user also decreases. In order to guarantee the same quality at the user, it may be necessary to open a further path in the multipath environment to be able to provide the same amount of data to the end user so that the quality of experience remains substantially the same. When the resolution increases it may be deduced that one of the path in the multipath environment may not be needed any more. With the invention it is possible to react to a change of the resolution by adapting the at least one path that is used for transmitting a video stream in the multipath environment.

Preferably the size of the reduce segments is determined and the change of the size can initiate the adaptation of the transmission path in the multipath environment. Initiating the change of the at least one path can mean that a further path is opened or one of the existing path is closed or can mean that another entity such as a policy controller is contacted in order to indicate that the at least one path should be adapted.

Furthermore the corresponding path control entity configured to control the at least one path in the multipath environment is provided. The path control entity comprises a memory and at least one processing unit, wherein the memory contains instructions executable by the at least one processing unit. The path control unit is operative to estimate a resolution used in the media stream based on the video segments. Furthermore the path adapting entity is operative to determine that the resolution used in the media stream has changed during the transmission and when the path adapting entity determines that the resolution used in the encrypted video stream has changed an adaptation of the number of the at least one path used for transmitting the video in the multipath configuration is initiated based on the determined change of the resolution.

Furthermore our a computer program comprising programme code to be executed by the at least one processing unit of the path control entity is provided wherein execution of the program code causes the at least one processing unit to execute a method as discussed above or as discussed in more detail below.

Additionally a carrier comprising the computer program is provided wherein the carrier is one of an electronic signal, optical signal, radio signal, or computer readable storage medium.

Alternatively a path control entity is provided configured to control the at least one path in the multipath environment wherein the path control entity comprises a first module configured to estimate the resolution used individual stream based on the video segments. The path control entity can furthermore comprise a second module configured to determine that the resolution individual stream is changed during the transmission and configured to initiate an adaptation of the number of the least one path used for the transmission when it is determined that the resolution used in the media stream has changed.

It is to be understood that the features mentioned above and features yet to be explained below can be used not only in the respective combinations indicated, but also in other combinations or in isolation without departing from the scope of the present invention. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 6 shows a table of a segment size of the reduce segment for different resolutions used in a video stream.

DETAILED DESCRIPTION OF EMBODIMENTS

Figure 1:
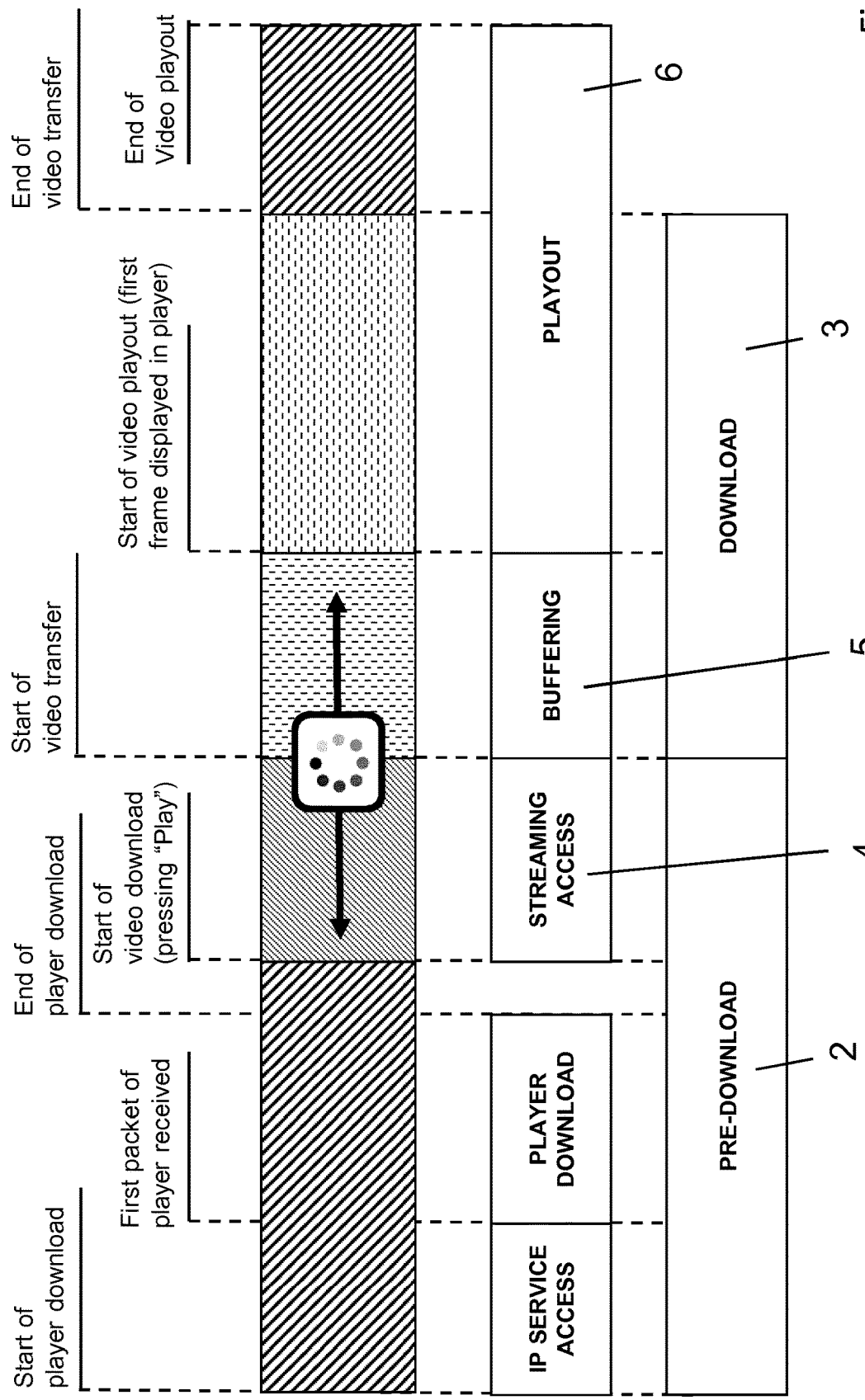
FIG. 1 schematically shows the different phases when a video stream is downloaded from a video source over the Internet as known in the art.
Figure 2:
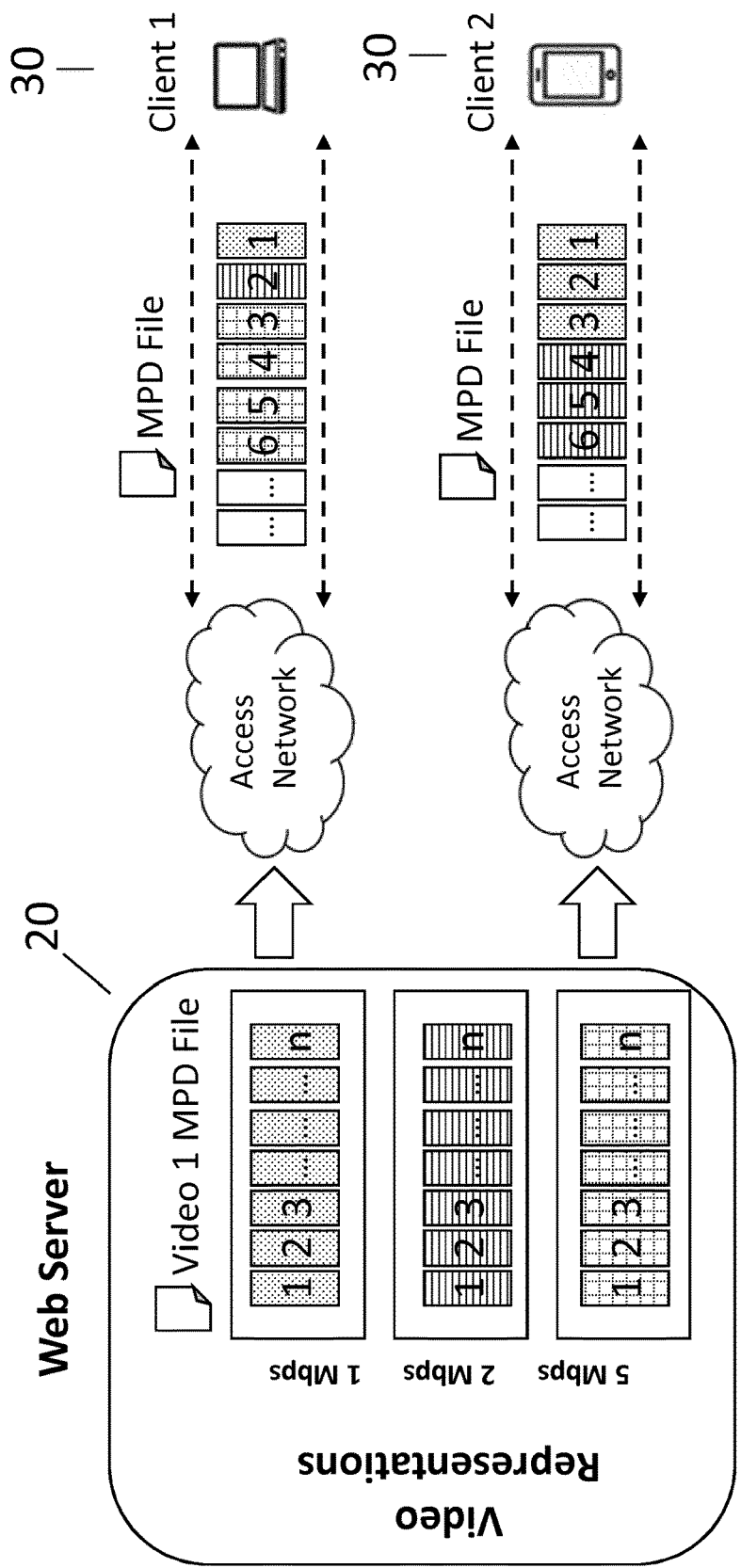
FIG. 2 shows a schematic architectural view of a system in which a dynamic adaptive streaming over HTTP is used a known in the art.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

Figure 4:
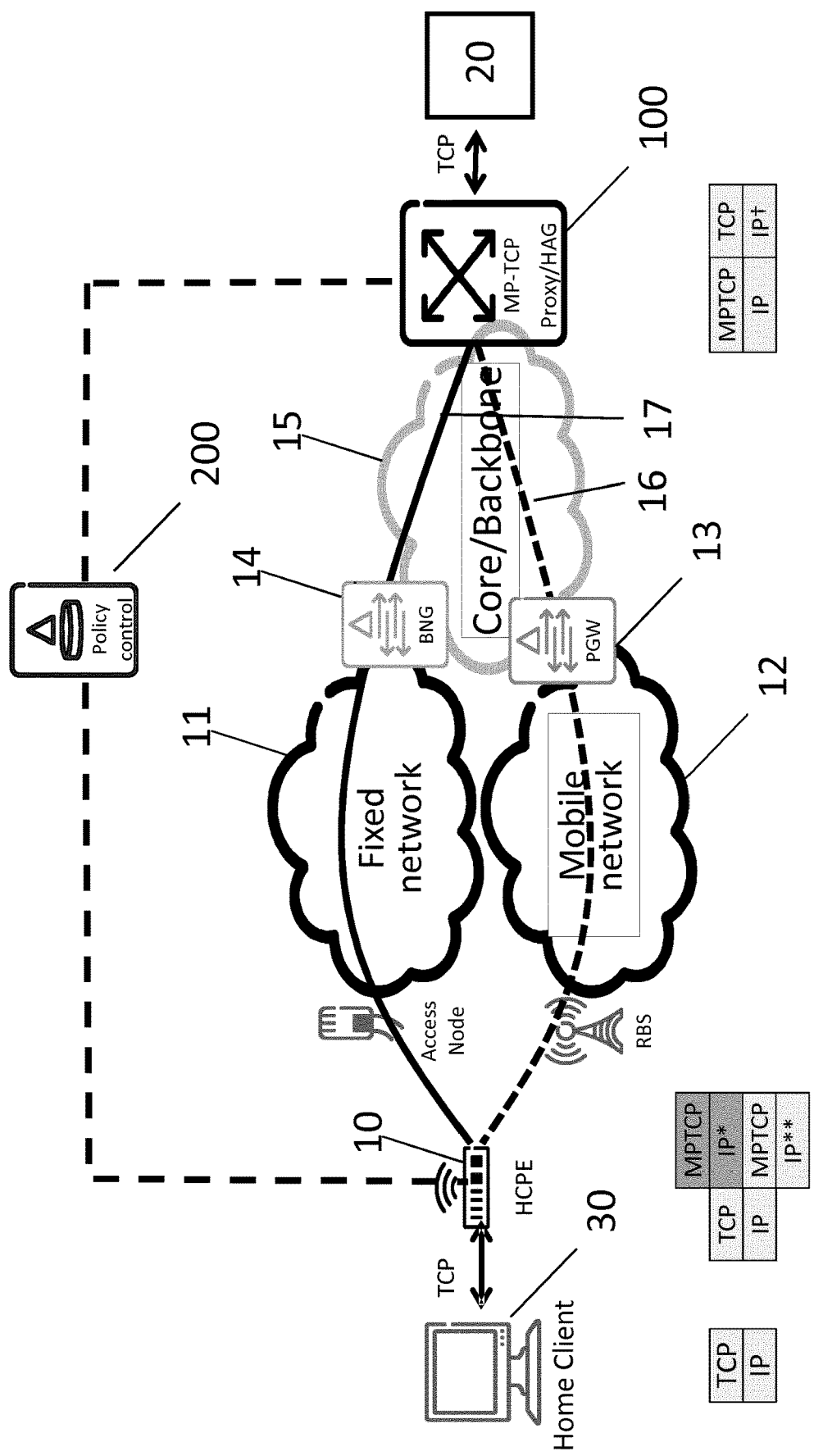
FIG. 4 shows a schematic architectural view of a multipath environment in which the path selected for transmitting a video is adapted based on the estimated size of the video segments.

FIG. 4 shows a solution in which the Hybrid access technology is used for transmitting an encrypted video stream from a web server 20 to a client 30. The home client 30 can be a mobile client/mobile entity or a fixed computing entity such as a desktop computer. The solution involves a hybrid customer premises equipment, HCPE, 10 on the client side, which provides at least two interfaces, e.g. two WAN (wide area network) interfaces, such as DSL and LTE communicating with a proxy, such as multi-service proxy MP-TCP Proxy or hybrid access gateway (HAG) 100. For the download of data from the internet server 20 the data can be split at HAG 100 and sent via the fixed network 11 and BNG (border network gateway) 14 to the hybrid customer premises equipment HCPE 10 and via the mobile network 12 passing PGW 13 (packet gateway). A policy control entity 200 controls the policies required for the data transmission. Between the HCPE 10 and the client end device 30 and between HAG 100 and the Internet server 20, normal TCP is used.

Figure 5:
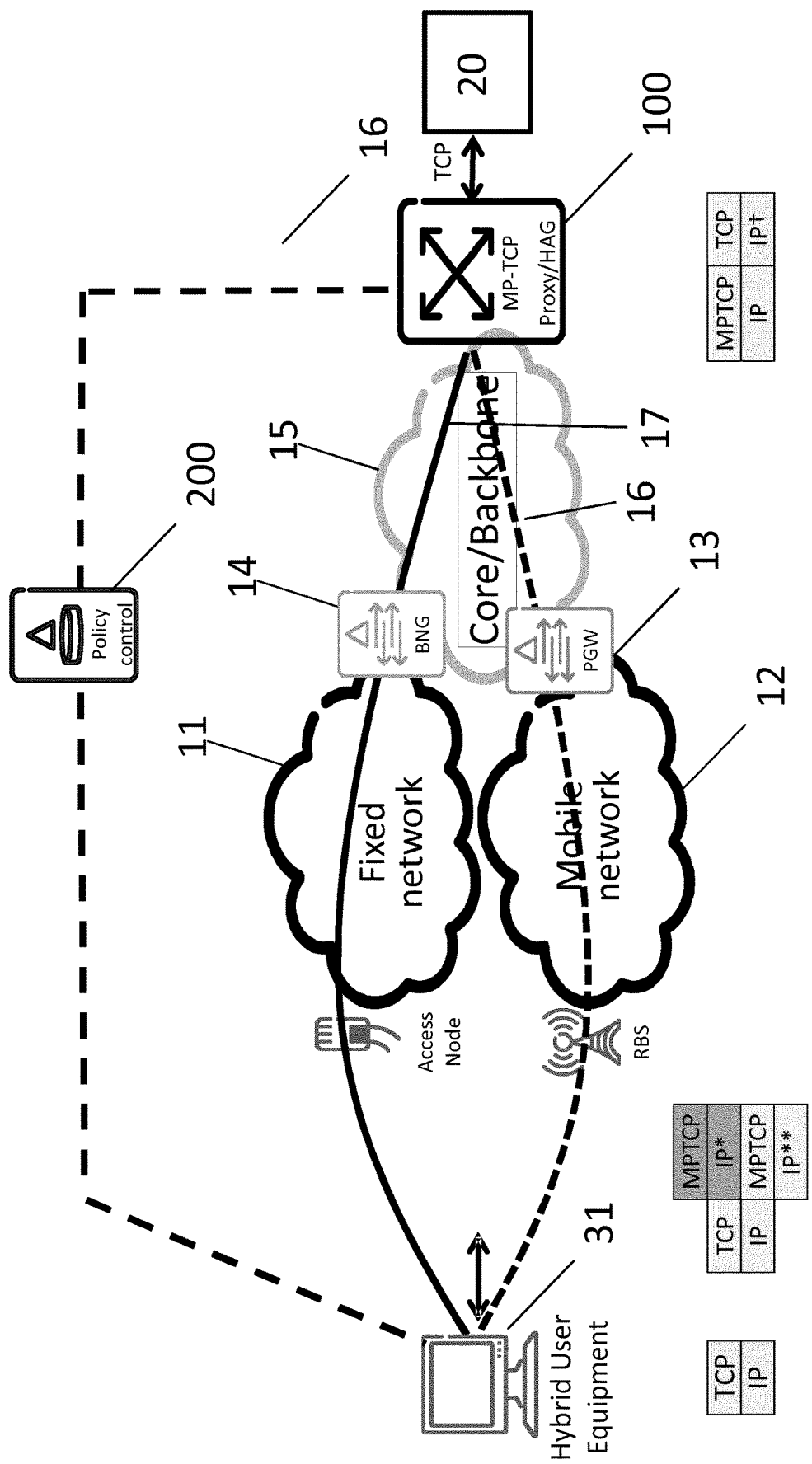
FIG. 5 shows another schematic architectural view of a multi-path environment in which the path selected for transmitting the video is adapted based on the estimated size of the video segments.

In FIG. 5 an embodiment similar to the situation as shown in FIG. 4 is disclosed with the difference that the user equipment itself is multipath enabled so that a hybrid equipment 31 is provided replacing the home client 30 and the HCPE 10.

In the following a mechanism be disclosed in which the resolution of an encrypted video which is transmitted in the embodiment of FIGS. 4 and 5 from the server 20 to the home client is detected based on the size of video segments. Furthermore the deviation of the size is determined and based on the determined deviation a path is selected for the transmission of the encrypted video stream. This can mean that a multipath leg is opened according to the determined resolution, especially according to the determined change in resolution. In the following the solution is described in an environment where the mobile communications network is an LTE network. However it should be understood that any other cellular or mobile communications network may be used, such as 3G or 5G or any other technology.

In the following it will be described how the resolution of the video stream or how the quality of the media stream is estimated. Furthermore the opening multipath leg based on the determined resolution is disclosed, the closing of a multipath leg based on the determined resolution. Furthermore implementation details for closing and opening a path in the multipath environment is given and an example of opening a multipath leg for a video session.

In the examples given below it is supposed that no services are able to support multipath from an end-to-end perspective in the mobile network. In FIG. 4 only the home client was multipath enabled. It is assumed that it is not possible to have servers able to communicate towards the end user sending the traffic natively in multipath. In the examples given below the HCPE is supporting the multipath traffic scenarios.

Estimation of Video Quality

In the following it will be disclosed how the quality of the encrypted video is estimated based on the resolution of the video.

The video resolution is analyzed according to the size of a video segment and its deviation against the mean of the average size of the video segments.

In FIG. 6 the size of 28 consecutive segments for the different resolution of the same video is listed, both for Android and IOS operating systems (OS). As a reference, for IOS OS, these 28 consecutive segments correspond to 2 min of video approximately.

According to the table shown in FIG. 6 video quality can be determined by calculating each segment size and how constant the size of consecutive segments is. Basically, OTT (Over the Top) video providers use CBR (Constant Bit Rate) encoding for low quality (144p and 240p) while VBR (Variable Bit rate) is used for medium and high quality.

When using CBR, the deviation between the different segments is not relevant to determine the video resolution (as all segments do have the same size) but the segment size will determine it, as the higher the quality the higher the segment size is.

When using VBR, the deviation between the different segments provides the video quality, wherein the higher the deviation the higher is the video quality.

When using CBR, it is enough with 2-3 video segments (for IOS, 12-18 seconds approximately) to derive the video resolution.

When using VBR, 5-7 video segments (for IOS, 30-42 seconds approximately) are enough to derive the video resolution.

The resolution of the video stream is detected analyzing the segment size of each video segment. Then, with this video segment size the resolution of the video can be deduced. The way to calculate the segment size for a video over HTTPS considers that:

- by means of the SNI (Subject name Indication) in a Client Hello message, it is identified that the flow contains video payload
- after a TLS (Transport Layer Security) handshake phase with the video server 20 is over, each uplink packet that has a TLS record containing Application data is considered as if a plain GET request is received
- when identifying an uplink packet with TLS Record containing Application data, DPI (Deep Packet Inspection) will start accumulating all the downlink payload received until next uplink packet with TLS Record containing Application Data.
- Above payload accumulation provides the segment size but to minimize the error, the size can be determined such that it lays in between some safety margins.

DPI can calculate each segment size and track how much the size of the following segments is deviated from the size of the previous segment. So, during a video download if the size of the segments decreases it means that the quality of the video has decreased and the QoE of the end user has been reduced.

To derive the video quality from the size deviation of the video segments, a Machine Learning algorithm (embedded in SPI software) can be used.

Machine learning is a scientific discipline that explores the construction and study of algorithms that can learn from data. Such algorithms operate by building a model based on inputs and using that to make predictions or decisions, rather than following only explicitly programmed instructions.

Machine learning techniques for traffic classification are based on behavioral characteristics from protocols and flows, such as TCP window size, ports, ip address, packet size distribution, time between packets, payload bit level statistics, etc. In unsupervised learning mode, machine is learning and comparing the behavior of the group towards the new devices, protocols. Then it groups those with same characteristics in the same cluster. By using unsupervised learning there is a growing accuracy when classifying packets. As more traffic goes through machine learning, clustering becomes a fine-grained classification, improving both the number of categories, and the fitness of each packet, according to its behavior.

In the present case the following steps may be carried out to train the algorithm:

1—First, a set of captures should be made, with different qualities selected, to train the algorithm: YouTube, Netflix, Vimeo, etc.

2—The above captures can be preprocessed, a temporal series with the outcoming and incoming payload is elaborated. The temporal series are created using the timestamp of each packet.

3—The Machine Learning (ML) algorithm comprises two different parts, a clustering algorithm (to identify any possible pattern) and a classification algorithm (supervised learning with tags to make the proper identification).

4—Once the algorithm is trained, a test set of captures can be processed. The temporal series of each flow will enter the ML algorithm and a percentage of accuracy is obtained.

5—When the ML algorithm is already trained and tested the temporal series of each flow can be classified as: Low quality, Medium quality, and High quality. It should be understood that other classifications (more granular classifications) are possible.

6—For an online classification, the temporal series will be made with a X packet's sliding window. For each income of payload sliding window temporal series is processed, a percentage will be raised indicating the percentage of accuracy in the classification. The ML-algorithm will give an answer when a percentage of accuracy is exceeded, 90% for example.

7—As the temporal series varies for each device, O.S. and platform (Browser or app), the algorithm can also identify where the traffic comes from.

8—During the online classification, as the algorithm uses a sliding window, it can identify changes of quality during the download of the video.

Open a Multipath Leg Based on QoE (i.e. a Resolution Parameter) Value

In the following example, the Hag 100, the policy server 200 and the HCPE 10 are involved.

Both HAG 100 and HCPE 10 can have Multipath and DPI capabilities. From a deployment perspective, these functionalities can be included in the HAG 100 or HCPE 10 nodes or deployed in a standalone fashion.

- Multipath: able to send traffic towards different networks. Also, able to join traffic from several paths into one single path. Able to open and close those multipath connections.
- DPI (Deep Packet Inspection): a technology which comprises inspecting/analyzing the contents of the IP data packets beyond the—so called—IP 5 tuples. The so-called IP 5 tuples comprises the heading elements of an IP data packet comprising: IP source address, IP destination address, source transport address, destination transport address, and protocol over IP (e.g. TCP, UDP). Therefore, put in short terms, DPI technology comprises inspecting and analyzing the application layer information conveyed by IP data packets. Because of the DPI analysis, service classification information can be obtained, which consists on IP packets being classified—i.e. after DPI processing—according to a configured tree of rules so that they are assigned to a service session. DPI is going to work with some Machine Learning algorithms.

Both HCPE 10 and HAG 100 have connectivity to a policy server as shown in FIG. 4 or 5. HCPE 10 and HAG send their capabilities towards the policy server as discussed above in connection with FIG. 3.

It will be discussed below how HAG 100 can report QoE measures towards policy server 200, based on a resolution parameter value obtained locally in the HAG 100. Then, the decision of opening a new path can be taken locally in the HAG 100 or externally in the policy server 200. In the policy server 200, other parameters from other nodes like Customer Premises Equipment (CPE) or Subscriber Profile Repository (SPR) can be considered.

Figure 3:
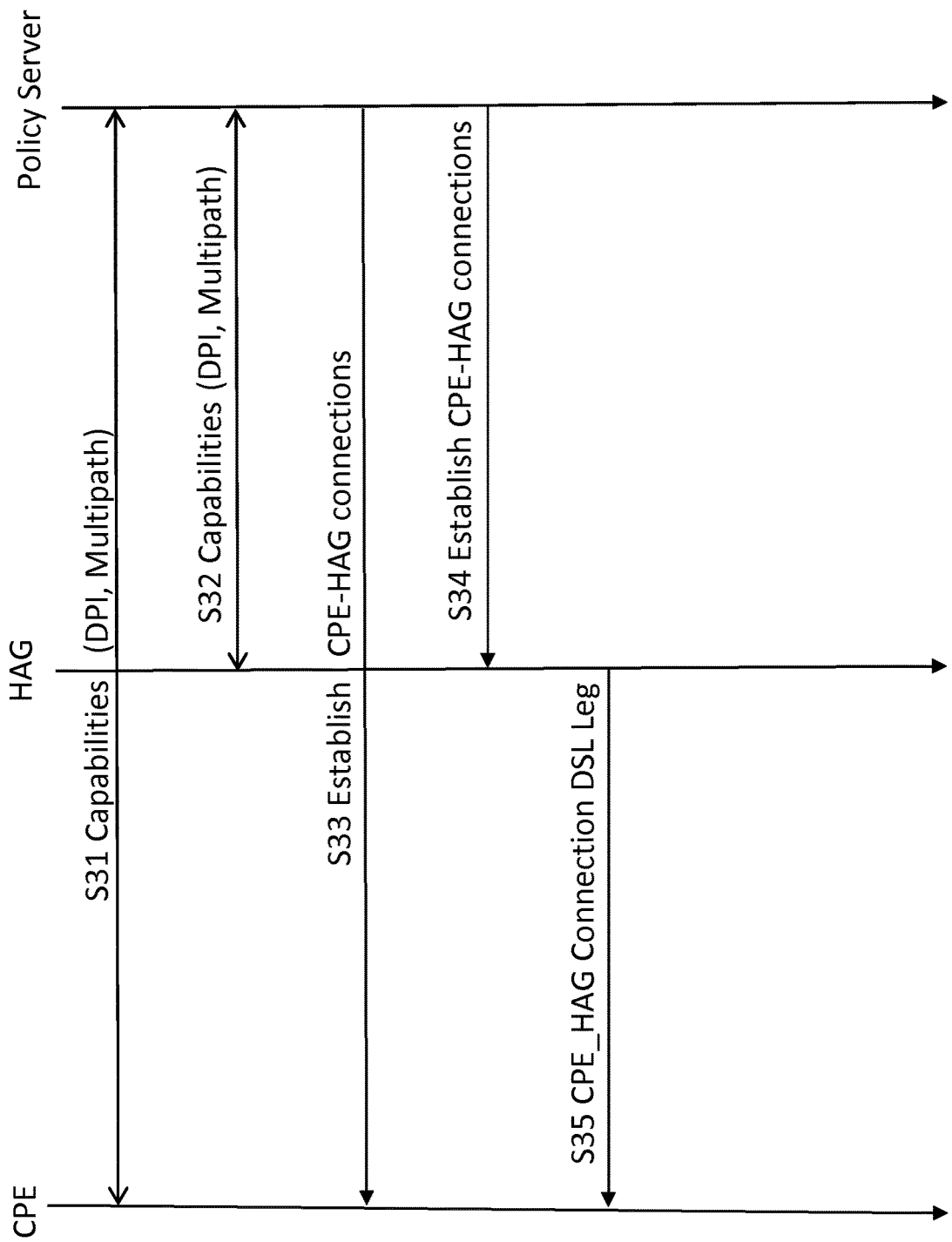
FIG. 3 shows a schematic view of a message exchange between a customer premises equipment and a policy server and hybrid access Gateway for reporting capabilities to the policy server as known in the art.

According to FIG. 3, HCPE and HAG send which capabilities are supported by them. In this example, DPI and multipath are supported. At this step, the policy server knows which capabilities are supported by both sides.

In this example below it is assumed that the end user and internet servers are not able to send traffic natively in multipath. Thus the situation as shown in FIG. 4 applies.

The way how currently HAG and HCPE are establishing the legs is known in the art. The HCPE 10 and HAG 100 are working as TCP Multipath proxy. Users who connect to HCPE open a TCP connection. Then HCPE and HAG have multipath connection between them. HAG talks multipath towards HCPE and TCP towards the internet server.

Depending how the resolution is calculated in the solution, there are two scenarios:
  First one when the resolution value is based on measures done locally in HAG 100 or HCPE 10.
  Second one, when there is an entity that is analyzing some metrics from different areas of the network. Then, analyzing those values can lead to the resolution of the end user communication. This value is sent towards the policy server which is responsible of determining which action should be done.

Both scenarios open a new path, if it is available, when the resolution of a user session for a specific service is degraded.

Regarding how traffic is distributed between paths several policies can be employed. The policy server 200 determines the first path that should be employed.

Figure 7:
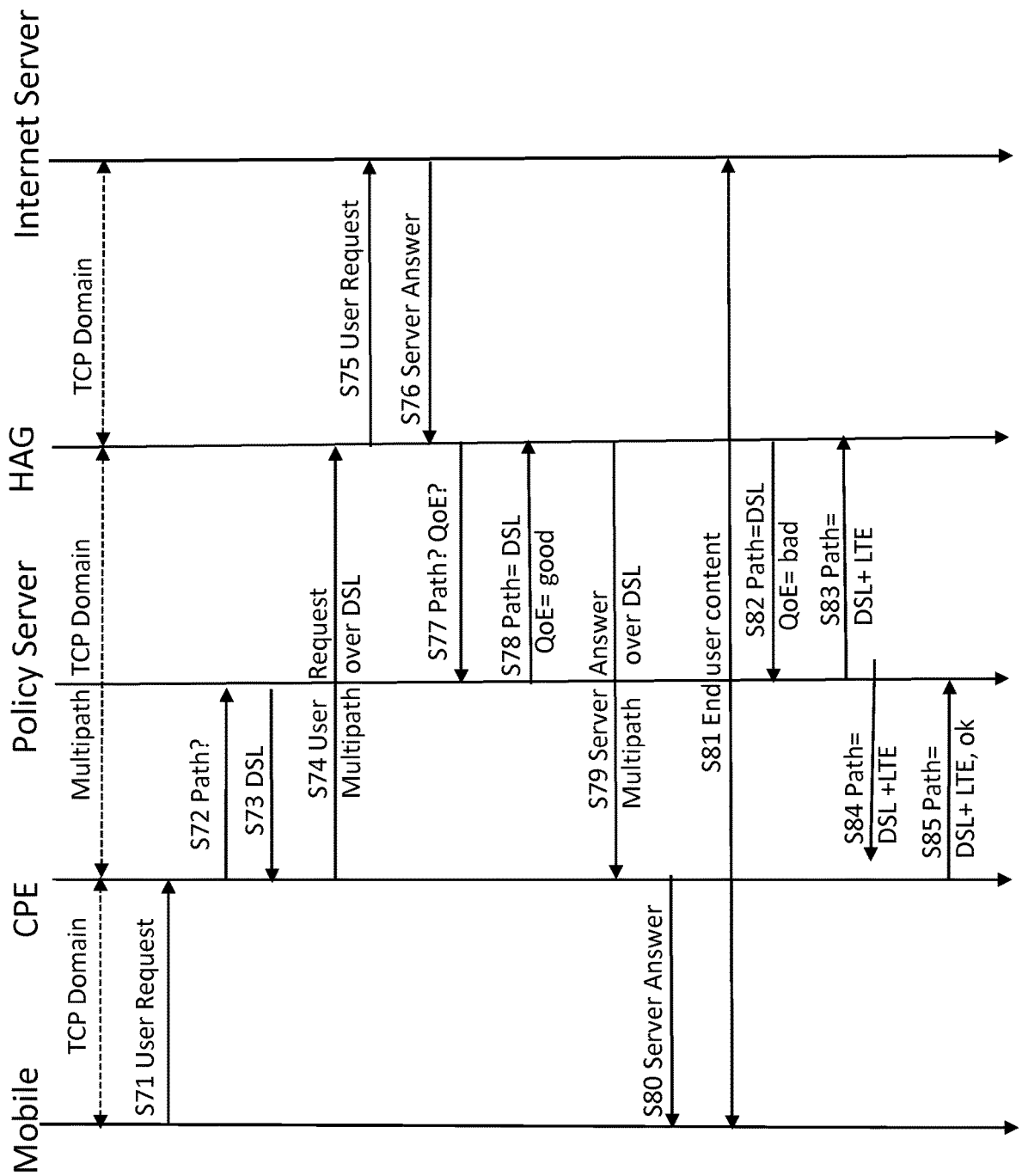
FIG. 7 shows a schematic view of a message exchange between involved entities when a new path is opened when the resolution used in the encrypted media stream changes.

In connection with FIG. 7 an example will be disclosed in which the resolution is obtained locally in the HAG 100.
  In step S71, End user asks for some content towards an internet server
  In steps S72 and S73, a HCPE 10 with multipath, asks towards Policy Server 200 which leg should use for this user. This routing decision can also be done locally in HCPE 100 according to predefined/preinstalled scheduler mechanism in the HCPE 10. This type of scheduler can consider the congestion of the path, the load of the path, which is the cheapest path from operator's point of view, etc. Policy server 200 answers in step S73 with the leg that the end user should use. In this case, DSL is opened.
  In step S74, traffic is sent from the HCPE 10 towards the HAG 100 using TCP Multipath over the DSL leg.
  In step S75, HAG 100 receives traffic over multipath and sends the traffic towards internet server using TCP. Using DPI capabilities, HAG identifies the service of the content request
  In step S76, internet server sends the content using TCP.
  In step S77, HAG 100 asks Policy server 200 which path should be used and which is the expected resolution for this content. The resolution parameter value i.e. the QoE parameter can be obtained locally from the HAG 100. One example of a protocol to be used is Diameter but others can be employed too. As an example of implementation (others can be defined), the QoE parameter is defined as a resolution parameter with 3 possible values: bad, medium, or good. Each value shall be defined according to the end user and/or operator requirements.
  In step 78, Policy server 200, particularly in this case, replies stating that the path is DSL and the QoE expected for this user and content is good.
  In step S79, using TCP multipath, HAG 100 sends the content towards HCPE 10 and starts analyzing the QoE/resolution parameter of the content
  In step S80, HCPE 10 receives the traffic via DSL using TCP multipath and sends towards the mobile via TCP.
  In step S81, Internet Server keeps on sending traffic to HAG 100 and HAG keeps on analyzing the resolution parameter of the user. For this analysis, DPI capabilities can be used
  In step S82, HAG 100 detects that the parameter value of the content has been degraded, i.e. is lower than good. It notifies this information towards the policy server 200.
  In step S83, policy server indicates that LTE multipath TCP should be opened. Thus there is an opening of a new path based on the QoE parameter.
  In step S84, policy server 200 pushes a rule towards HCPE 10 indicating that both paths should be employed for uplink traffic. Diameter with a Push Notification Record can be employed for this notification or any other protocol can be employed too.
  In step S85, HCPE 10 answers towards policy server 200 that the rule has been installed correctly.

After this step, traffic is sent using both LTE and DSL paths.

Figure 9:
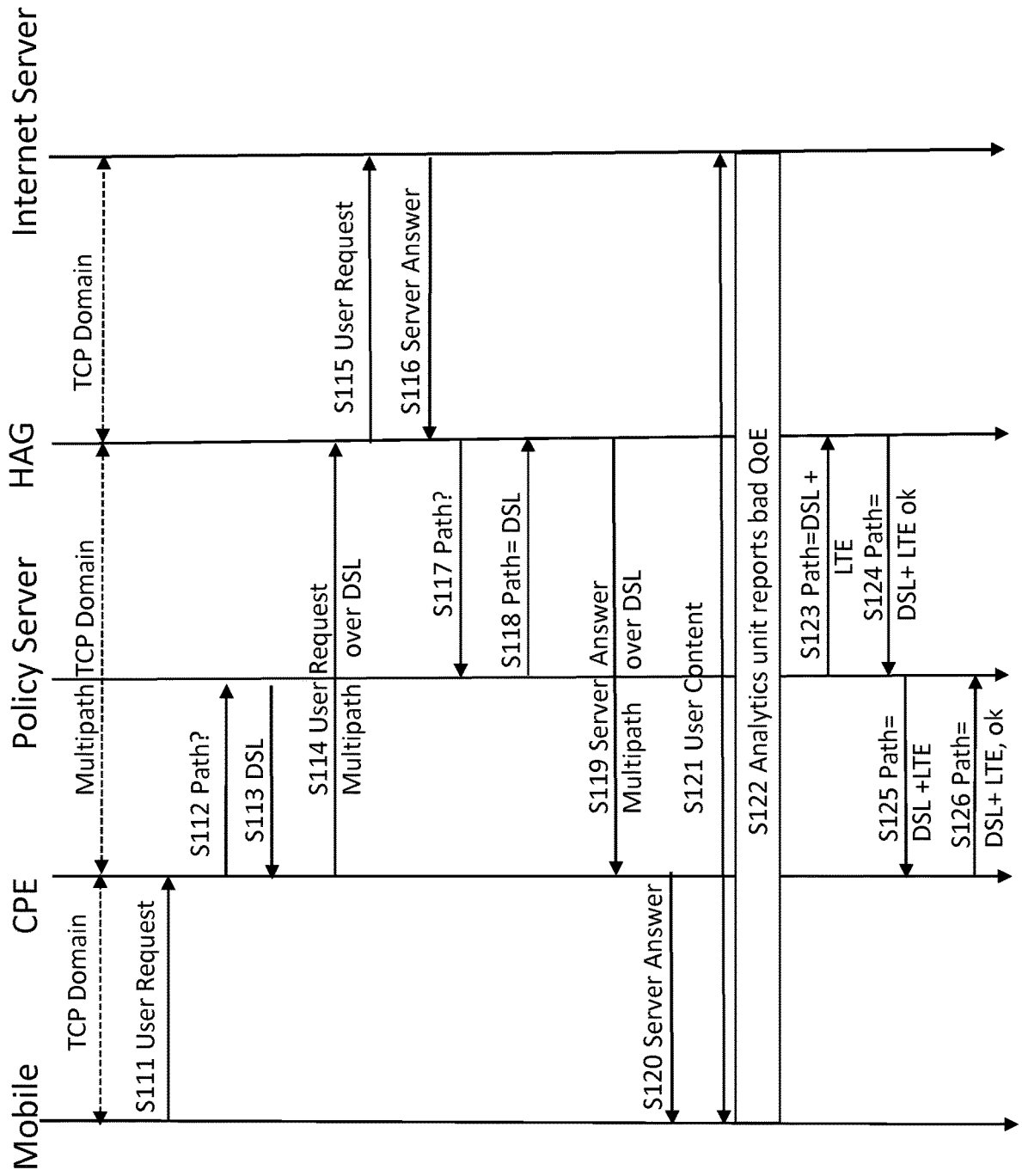
FIG. 9 shows a schematic view of a message exchange between the involved entities when a new path is opened based on the video resolution which was determined externally.

In the next example of FIG. 9 the resolution parameter values are determined externally by an analytics unit. The analytics unit is an external entity that receives information from different nodes regarding the communication of an end user with a flow. It can provide the QoE of end user communication. It could be included as part of the PCRF or as an external entity. In this example, it has been included as part of the policy server 200.

In FIG. 9, the following steps are shown:
  In step S111, End user with a mobile entity asks for some content towards an internet server 20. Analytics entity starts collecting information of the end user session.
  In steps S112 and S113, a HCPE 10 with multipath capabilities asks towards Policy Server 200 which leg should use for this user. This routing decision can also be done locally in HCPE 10 according to predefined/preinstalled scheduler mechanism in the HCPE. This type of scheduler can consider the congestion of the path, the load of the path, which is the cheapest path from operator's point of view, etc. Policy server answers with the leg that the end user should use. In this case, DSL is opened.
  In step S114, traffic is sent from the HCPE 10 towards the HAG 100 using TCP Multipath over the DSL leg.
  In step S115, HAG 100 receives traffic over multipath and sends the traffic towards internet server 20 using TCP. Using DPI capabilities, HAG 100 knows the type of services that end user requests.

In step S116, internet server 20 sends the content using TCP.

In step S117, HAG 100 asks Policy server 200 which path should be used.

In step S118, Policy server 200, in this example, replies stating that the path is DSL.

In step S119, using TCP multipath, HAG 100 sends the content towards HCPE.

In step S120, HCPE 10 receives the traffic via DSL using TCP multipath and sends towards the mobile via TCP.

In step S121, Internet Server 20 keeps on sending traffic to HAG

In step S122, Policy server is informed by its analytics entity that the parameter value of the content has been degraded, i.e. is lower than good. When the end user session starts (step S111), analytics unit is collecting and analyzing information from different network nodes to infer the resolution and the parameter value as resolution parameter of the end user session. In this example, from step S111 to step S121 the analytics unit has obtained the QoE/parameter value with a good value. In this step (S122) analytics unit detects that the QoE has been degraded to a bad value.

In step S123, policy server 200 indicates that LTE multipath TCP should be opened in the downlink direction. Accordingly here a new path is opened based on the resolution parameter.

In step S124, policy server 200 pushes a rule towards HCPE 10 indicating that both paths should be employed for uplink traffic. Diameter with a Push Notification Record can be employed for this notification, other protocols can be employed too.

In step S125, HCPE 10 answers towards policy server 200 that the rule has been installed correctly.

After this step, traffic is sent using both LTE and DSL paths.

Close a Multipath Leg Based on the Resolution Parameter Value

In another example discussed in connection with FIGS. 10 and 11 a multipath leg is closed based on the resolution parameter.

There is a mechanism to indicate when one path is closed. Depending if the resolution parameter is obtained locally in the HAG 100 or in the analytics unit, there are the same two scenarios as explained above for the opening of a new path:

First one when the resolution parameter value is based on measures done locally in HAG 100 or HCPE 10.

Second one, when there is an entity that is analyzing some metrics from different areas of the network. Then, analyzing those values can obtain a resolution parameter of the end user communication. This value is sent towards the policy server which is responsible of determining which action should be done.

Both scenarios close the path, when there is more than one path employed, when the resolution parameter of a user session for a specific service is improved. The policy for selecting which path should be closed is defined according to criteria such as which path has more congestion, which is the most expensive path, etc.

Figure 10:
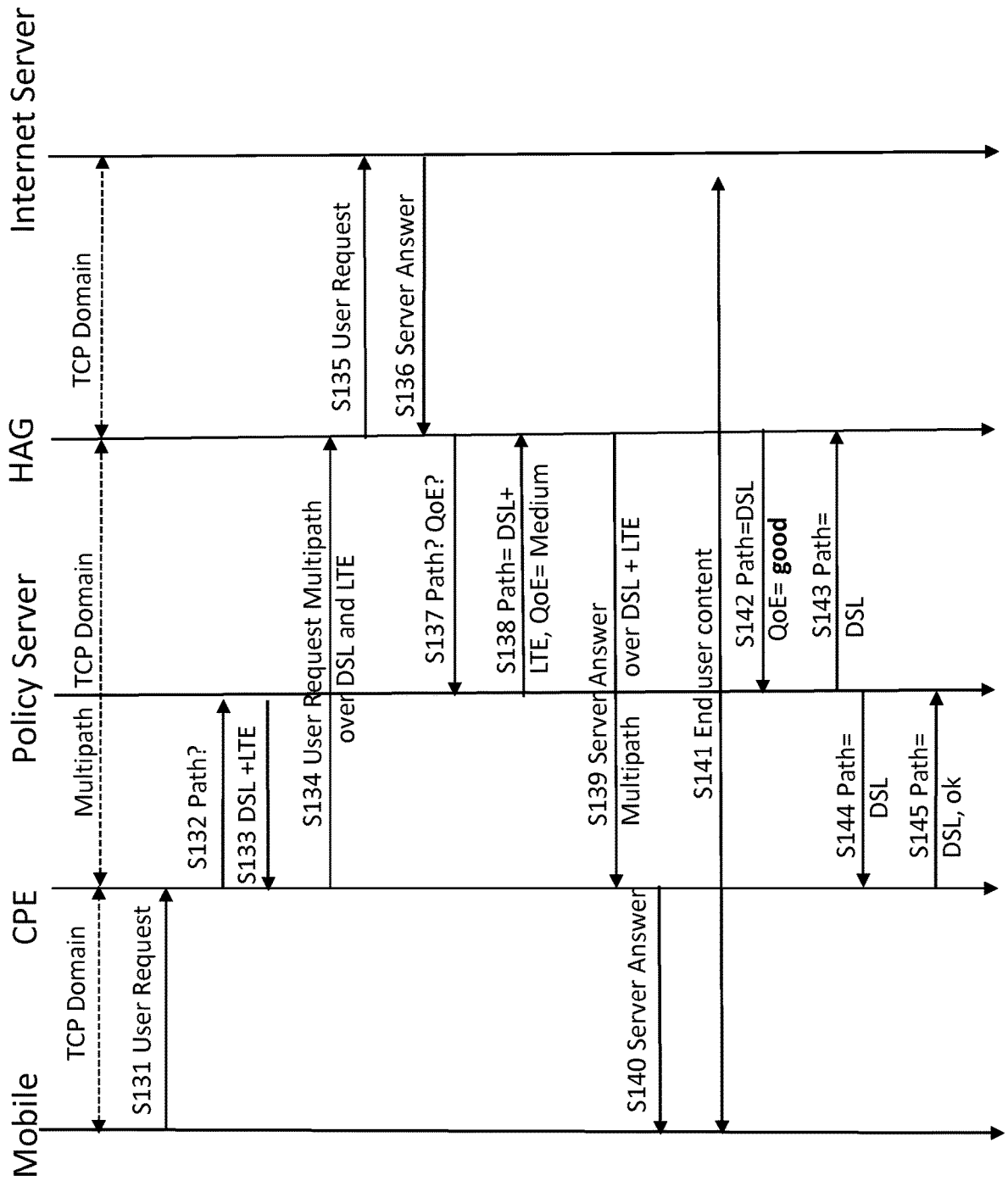
FIG. 10 shows a schematic view of a message exchange between the involved entities when an existing path is closed based on a locally determined change of the video resolution.

FIG. 10 shows the following steps:

In step S131, End user asks for some content towards an internet server 20.

In steps S132 and S133, a HCPE 10 with multipath, asks towards Policy Server 200 which leg should use for this user. This routing decision can also be done locally in HCPE 10 according to predefined/preinstalled mechanism in the HCPE. This type of policy can consider the congestion of the path, the load of the path, which is the cheapest path from operator's point of view, etc. Policy server 200 answers with the leg that the end user should use. In this case, DSL+LTE are opened.

In step S134, traffic is sent from the HCPE 10 towards the HAG 100 using TCP Multipath over the DSL and LTE legs.

In step S135, HAG 100 receives traffic over multipath and sends the traffic towards internet server using TCP. Using DPI capabilities, HAG 100 knows the type of service that end user requests.

In step S136, internet server sends the content using TCP.

In step S137, HAG 100 asks Policy server 200 which path should be used and which is the expected resolution parameter for this content. The resolution parameter can be obtained locally from the HAG 100. As an example of protocol to be used is Diameter but others can be employed too. As an example of implementation (others can be defined), the resolution parameter is defined as a string with 3 possible values: bad, medium, or good based on the determined resolution. Each value shall be defined according to the end user and/or operator requirements.

In step S138, Policy server 200 in this case, replies stating that the paths are DSL+LTE and the resolution parameter expected for this user and content is medium.

In step S139, using TCP multipath, HAG 100 sends the content towards HCPE 10 and starts analyzing the resolution parameter of the content In step S140, HCPE 10 receives the traffic via DSL and LTE using TCP multipath and sends towards the mobile via TCP.

In step S141, Internet Server 20 keeps on sending traffic to HAG and HAG keeps on analyzing the resolution parameter of the user. For this analysis, DPI capabilities can be used.

In step S142, HAG detects that the resolution parameter of the content has been upgraded, i.e. is good. It notifies this information towards the policy server 200.

In step S143, policy server indicates that LTE multipath TCP should be closed. Thus in the example a closing a new path based on the resolution parameter is carried out.

In step S144, policy server 200 pushes a rule towards HCPE 10 indicating that only one path should be employed for uplink traffic (DSL in this case). Diameter with a Push Notification Record can be employed for this notification other protocols can be employed too.

In step S145, HCPE 10 answers towards policy server 200 that the rule has been installed correctly.

After this step, traffic is sent using DSL path.

Figure 11:
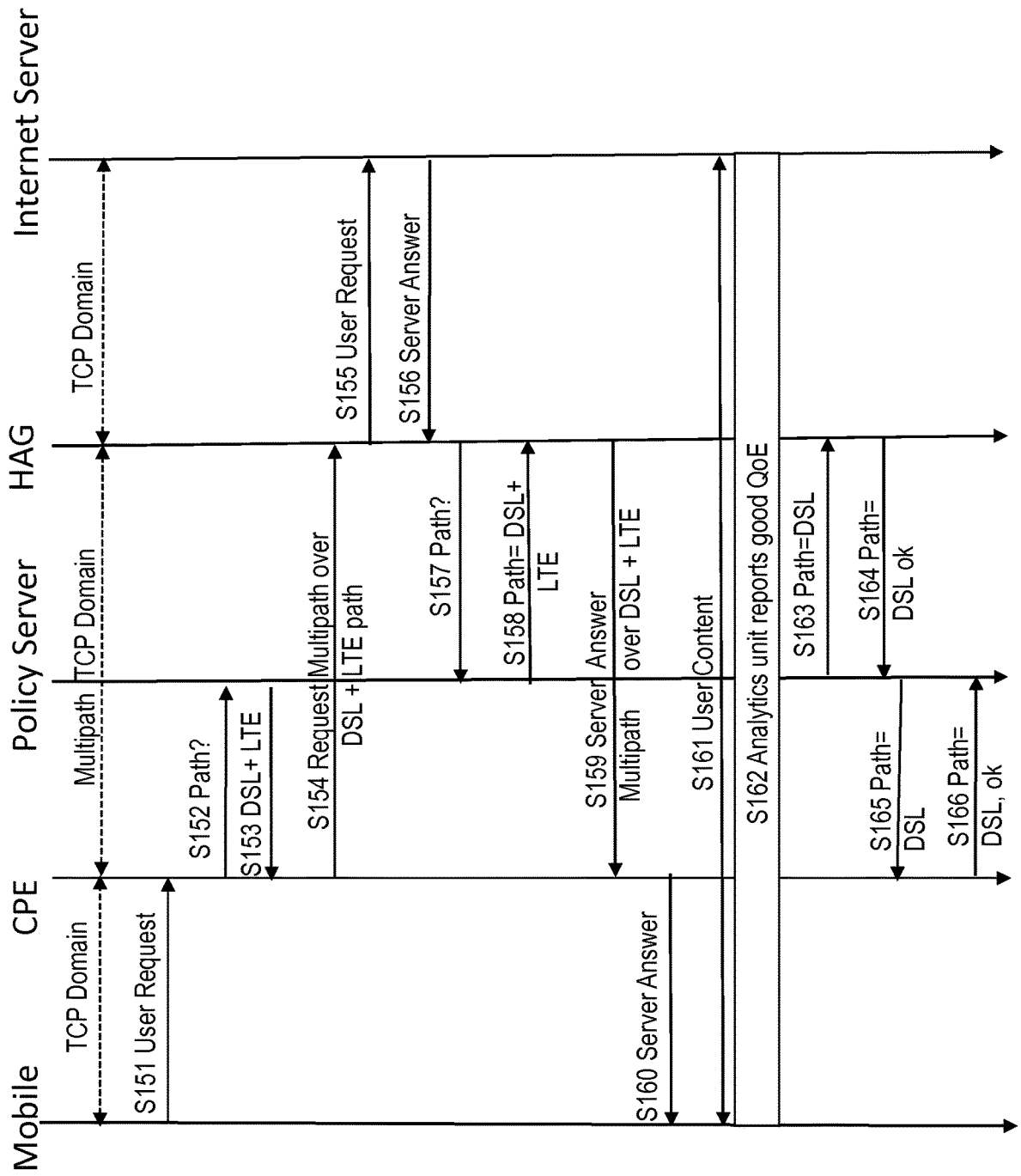
FIG. 11 shows a schematic view of a message exchange between involved entities when an existing path is closed based on a determined change of video resolution which was determined externally.

In connection with FIG. 11, an example will be disclosed in which the resolution parameter is obtained externally.

Analytics unit is an external entity that receives information from different nodes regarding the communication of an end user with a flow. It can provide the QoE of end user communication. It could be included as part of the PCRF or as an external entity. In this example, it has been included as part of the policy server 200.

In FIG. 11, it is defined the following steps:

In step S151, End user asks for some content towards an internet server 20. Analytics unit starts collecting information of the end user session.

In steps S152 and S153, a HCPE 10 with multipath asks towards Policy Server 200 which leg should use for this user. This routing decision can also be done locally in HCPE 10 according to predefined/preinstalled scheduler mechanism in the HCPE. This type of scheduler can consider the congestion of the path, the load of the path, which is the cheapest path from operator's point of view, etc. Policy server answers with the leg that the end user should use. In this case, DSL+LTE are opened.

In step S154, traffic is sent from the HCPE 10 towards the HAG 100 using TCP Multipath over the DSL and LTE legs.

In step S155, HAG 100 receives traffic over multipath and sends the traffic towards internet server using TCP. Using DPI capabilities, HAG knows the type of service that end user requests In step S156, internet server 20 sends the content using TCP.

In step S157, HAG 100 asks Policy server 200 which path should be used.

In step S158, Policy server, 200 in this case replies stating that the paths are DSL+LTE.

In step S159, using TCP multipath, HAG 100 sends the content towards HCPE 10.

In step S160, HCPE 10 receives the traffic via DSL and LTE using TCP multipath and sends towards the mobile via TCP.

In step S161, Internet Server keeps on sending traffic to HAG 100

In step S162, Policy server 200 is informed by its analytics unit that the resolution parameter of the content has been upgraded, i.e. is higher than medium. When the end user session starts (step S151), analytics unit is collecting and analyzing information from different network nodes to infer the resolution parameter of the end user session. In this example, from step S151 to step S161 the analytics unit has obtained the resolution parameter with a medium value. In this step (S162) analytics unit detects that the resolution parameter has been upgraded to a good value. Policy server decides to close the path according to one of the policies such as cheaper path, less loaded path, etc.

In step S163, policy server 200 indicates that LTE multipath TCP should be closed in the downlink direction. Thus in this example a new path is closed based on the resolution parameter.

In step S164, policy server 200 pushes a rule towards HCPE 10 indicating that only path (DSL) should be employed for uplink traffic. Diameter with a Push Notification Record can be employed for this notification, other protocols can be employed too.

In step S165, HCPE 10 answers towards policy server 200 that the rule has been installed correctly After this step, traffic is sent using DSL path.

For opening and closing path, to avoid ping-pong effects, it is possible to have a hysteresis decision to prevent tiny fluctuations from causing unwanted flickering in the decision result. In particular, for opening a path you have a trigger that is segment size=X but for closing the path you select a trigger that is a segment size=X− value. With this one avoids opening and closing paths when values are near to X. Consequently, if the input value is significantly above or below the decision threshold, the opening/closing the path will change state, but when the input is near the threshold, it just keeps on doing whatever it had previously decided, such that unwanted rapid switching is prevented.

It is furthermore possible, not to use closing mechanism if there are enough available resources in the paths.

In case of a conflict between what the policy server 200 says and what is measured locally in the node, the following policies may be used:

Apply what policy server 200 defines. Useful when policy server 200 is aware of network status and usage of the network. Normally, when an SDN Controller is aware of the multipath or analytics module is measuring the QoS of the network.

Apply what local node defines. Useful when there is no analytics in the policy server 200 and it has no idea of the network status.

Mix of both. Some services are going to apply local policies and for others what policy server 200 defines. It will depend on which services analytics module is being enabled or if SDN controller is checking what is happening in the network.

By way of example, policy server requests sending traffic to a new path but new path according to local measures is congested.

Figure 8:
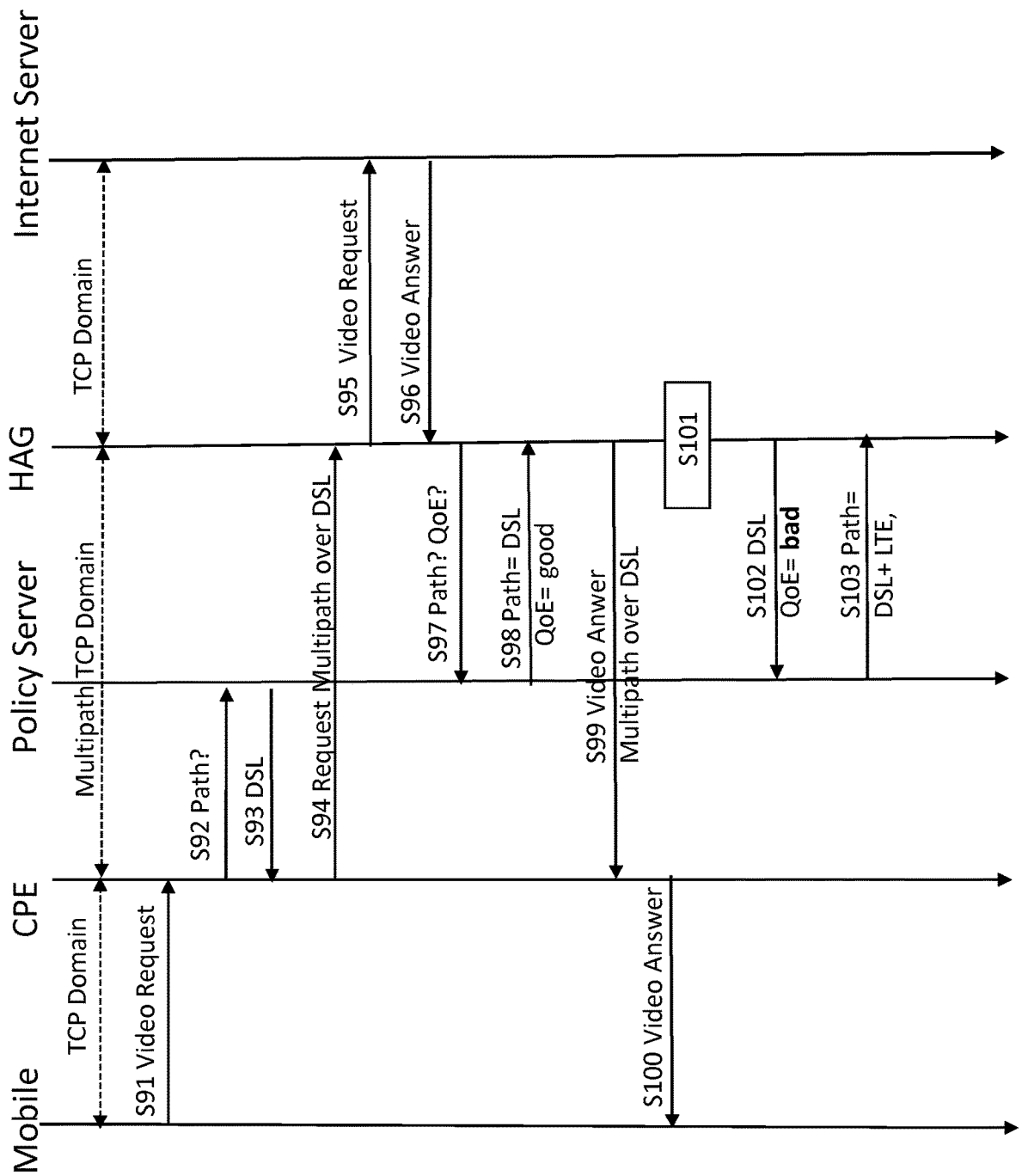
FIG. 8 shows a schematic view of a message exchange between the involved entities when a path in the multipath environment is changed based on the estimated resolution of a video.

In connection with FIG. 8 an opening of a multipath leg for a video session is discussed. In this example, it is explained how to open a new path in multipath based on the resolution parameter of a video session that uses encrypted HTTP traffic. It is an example of combining the method defined.

In step S91, End user establishes a video session towards video internet server 20.

In steps S92 and S93, a HCPE with multipath asks towards Policy Server 200 which leg should be used for this user. This routing decision can also be done locally in HCPE 10 according to predefined/preinstalled mechanism in the HCPE. Policy server 200 answers with the leg that the end user should use. In this case, DSL leg.

In step S94, traffic is sent from the HCPE 10 towards the HAG 100 using TCP Multipath over the DSL leg.

In step S95, HAG 100 receives traffic over multipath and send the traffic towards internet server using TCP. Using DPI, HAG 100 knows the type of content request (in this example, video content)

In step S96, internet server 20 sends the video content using TCP. Through DPI, HAG knows that this is a video request.

In step S97, HAG 100 asks Policy server 200 which path should be used and if there is any video quality requirement for this subscriber.

In step S98, Policy server 200, in this case, replies stating that the path is DSL and indicates the target video resolution parameter level. For this example, good quality is required (i.e. a minimum resolution of 480 p)

In step S99, using TCP multipath, HAG 100 sends the video traffic towards HCPE 10 and starts analyzing the user's resolution parameter based on measures extracted from the video traffic.

In step S100, HCPE 10 receives the traffic via DSL using TCP multipath and sends towards the mobile via TCP In step S101, while video content is being delivered from server to client, HAG 100, using DPI capabilities, notifies to policy server 200 any deviation on video quality from the one indicated by policy server in Step S98. The resolution parameter is estimated based on the method described above. The resolution parameter of the video is estimated in HAG 100 based on changes in the video resolution. If good quality was required and, for example, the estimation is that video resolution is 144p (the lower video resolution), Policy Server 200 is notified about the QoE degradation In step S102, to mitigate the degraded video quality, policy server 200 indicates that LTE multipath TCP should be opened. Here there is a report towards the policy server (this decision can be taken locally, in case in other architectures there is no policy server) that a new leg should be opened because the resolution parameter is not good.

After step S98, HAG 100 is aware of the video quality requested by policy server.

During step S99 and S101, HAG 100, by means of DPI, tracks each of the video segments and calculate the segments size and the segments dispersion.

Based on the estimation of video quality and the target video quality induced by Policy Server 200, HAG 100 will be able to report any significant deviation to Policy Server and, Policy Server will take the proper action to mitigate that deviation:

If the resolution parameter is degraded, LTE leg shall be open

If the resolution parameter is improved. LTE leg shall be closed

For the case, for example, video quality requested by policy server is high quality (720p or higher) and HAG is calculating a segment size dispersion almost negligible, meaning that video is being reproduced with low quality (144p or 240p), according to what it is indicated on step S101, HAG 100 will notify the policy server 200 that the video is not being reproduced with the requested quality.

The following Use Cases are possible with the proposed solution discussed above:

Use Case 1: User Subscription to Video with Maximum Quality (e.g. 480p)

This Use Case allows the network operator to optimize the network resources by enforcing a maximum video quality for certain subscribers (e.g. non-premium subscribers).

By using the mechanisms described above, the network will be able to detect the resolution used in a subscriber's video session and in case the detected video resolution (e.g. 720p) is above the subscribed value (e.g. 480p), the network will be able to apply a certain enforcement action (e.g. throttling or bandwidth limitation) to ensure the subscriber terminal does not use a video resolution with higher quality than the subscribed one.

Use Case 2: User Subscription to Video with a Guaranteed Minimum Quality (e.g. 480p)

This Use Case allows the network operator to optimize the network resources by enforcing a minimum video quality for certain subscribers (e.g. premium subscribers).

By using the mechanisms described above, the network will be able to detect the resolution used in a subscriber's video session and in case the detected video resolution (e.g. 240p) is below the subscribed value (e.g. 480p), the network will be able to apply a certain enforcement action to ensure the subscriber terminal uses a video resolution with higher quality than the subscribed one. The possible enforcement actions are:

Improve QoS for the default bearer or trigger a dedicated bearer to carry the video traffic. In both cases with better QCI, so UE selects higher resolution in next video segments.

Use Case 3: Video Quality Control Under Congestion or CPU Limit

This Use Case allows the network operator to optimize the network resources by enforcing a maximum video quality for certain subscribers (e.g. non-premium subscribers) when there is congestion or network nodes reach CPU limits.

By using the mechanisms described above, the network will be able to detect the resolution used in a subscriber's video session and, in case there is network congestion or some network node/s reach their CPU limit (e.g. 85%), the non-premium subscribers will get their video traffic throttled or bandwidth limited in case the detected video resolution (e.g. 720p) is above a configured value (e.g. 480p). When the congestion situation (or CPU usage) is relieved, the throttling action will finish.

For Use Case 1 and Use Case 2, one of the possibilities is reporting % of time the video resolution was below the threshold and the number of resolution changes (both as objective measurements of video QoE).

Figure 12:
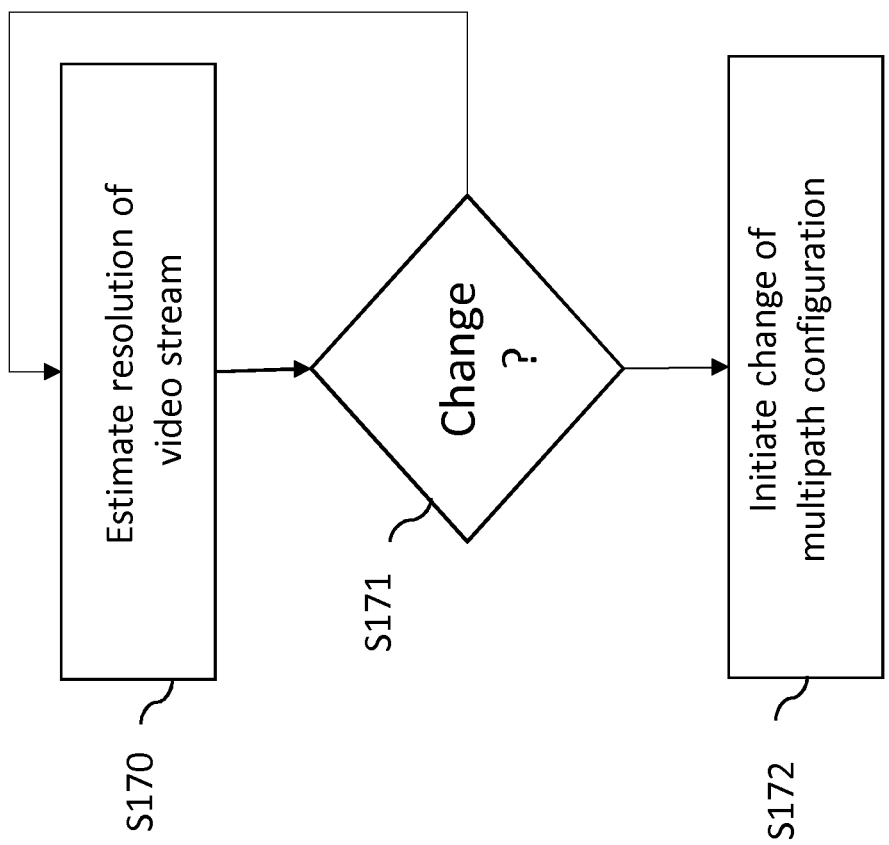
FIG. 12 shows an example flowchart of carried out by a flow control entity for adapting a multipath configuration.

In FIG. 12 some of the steps carried out either at the hybrid access Gateway 100 or the policy server 200 are summarised. In the examples mentioned above either the gateway 100 on the policy server 200 initiates the adaptation of the multipath environment. Accordingly the Gateway 100 or the policy server 200 play a role of a path control entity. This path control entity estimates the resolution of the media stream, based on the video segments, especially based on the change in size of the video segments. This resolution is controlled or monitored continuously and in step S 171 it is asked whether the resolution has changed, but way of example changed by more than a threshold. The resolution can be categorized into several resolution parameter values e.g. 3 to 4 different values. If the resolution in the image frames changes such that the resolution parameter changes to another value, the multipath configuration can be adapted. If this is the case the change of the multipath environment is initiated, either by adding a new like to the multipath configuration or by closing an existing leg of the multipath configuration.

Figure 13:
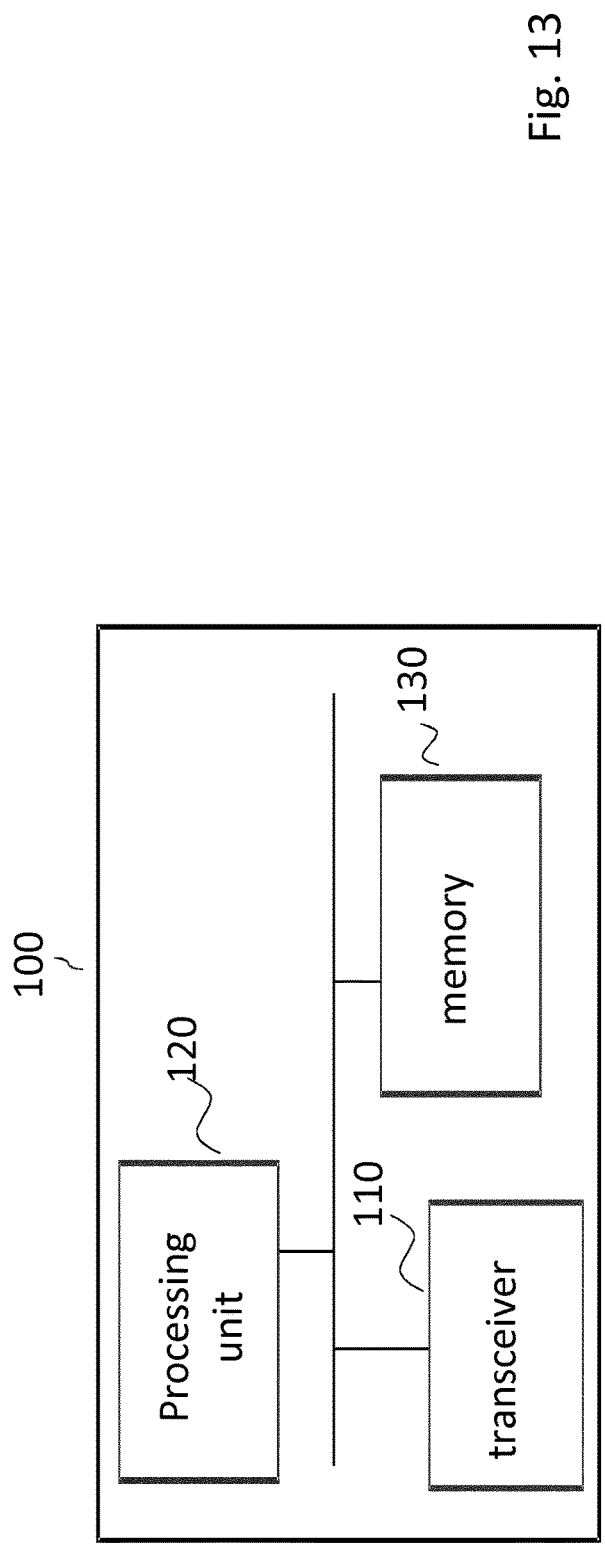
FIG. 13 shows an example schematic representation of a path control entity which is configured to control the at least one path in the multipath environment.

FIG. 13 shows a schematic architectural view of an the path control entity, here the HAG 100 which can carry out the above discussed controlling of the multipath environment based on a change of the resolution in the transmitted video stream. The HAG 100 comprises a transceiver 110 which is provided for transmitting user data or control messages to other entities and for receiving user data and control messages from other entities such as the policy server, the HCPE or the video server. The HAG 100 furthermore comprises a processing unit 120 which is responsible for the operation of the HAG 100. The processing unit 120 comprises one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above described functionalities in which the HAG is involved. In the same way when the policy control unit is the policy server 200 the policy server 200 can be embodied as discussed above in connection with FIG. 13.

Figure 14:
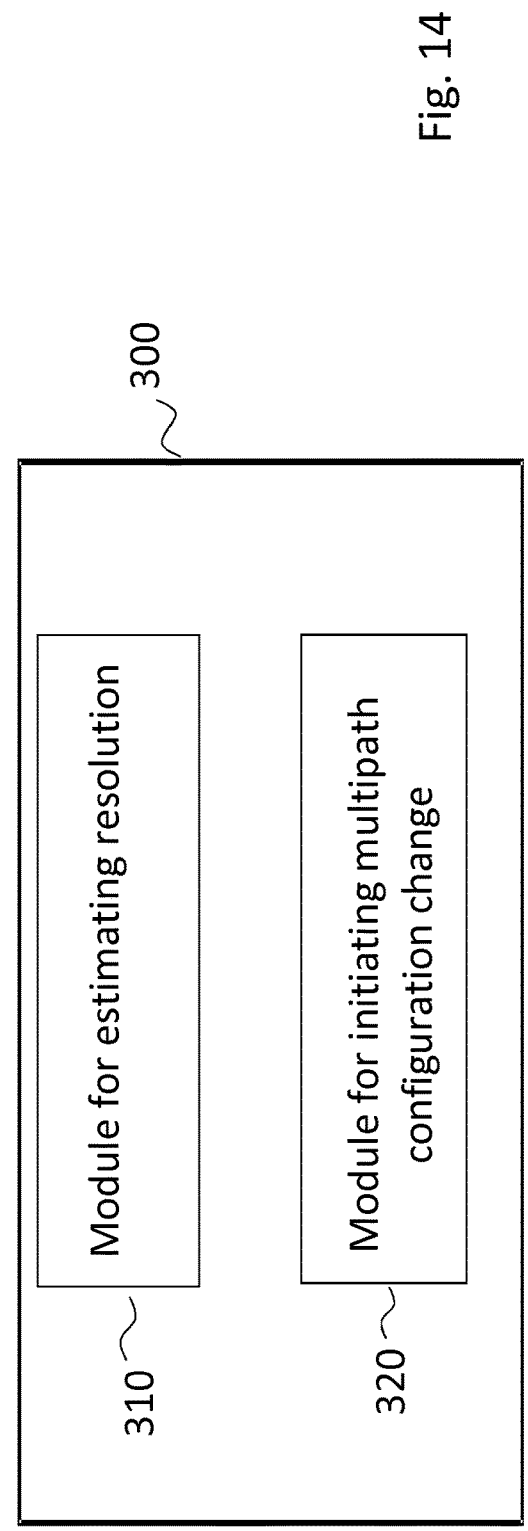
FIG. 14 shows another example schematic representation of a path control entity which is configured to control the at least one path in the multipath environment.

In connection with FIG. 14 another embodiment of a path control entity as shown. In the example shown in FIG. 14 the path control entity 300 comprises a module 310 configured for estimating the resolution of the encrypted media stream and configured to estimate the resolution parameter as discussed above. A module 320 is provided which is configured for initiating the change of the multipath configuration, meaning that either a new path is opened or an existing path is closed.

From the above said some general conclusions can be drawn:

For the multipath control entity, either the hybrid access Gateway 100 or the police server 200, the step of estimating the resolution can comprise the step of determining a size of the video segments used in the video stream and can comprise the step of determining a change of the size of the video segments over time. The resolution used in the stream is estimated taking into account the determined size and the determined change of the size. One example for the determination of the size and the change of the size comprises the step of determining an average size of a defined number of last video segments, e.g. the videos present in a moving window. Furthermore a mean value of the average size of the defined number of last video segments can be determined and when a deviation of the mean value is larger than a threshold value, the adaptation of the at least one path in the multipath environment is initiated.

When an adaptation of the at least one path is initiated, this can mean that a new path is opened or an existing path is closed based on the determined change of the resolution.

When the resolution is estimated, it is possible to estimate the resolution of the video frames present in the video stream and this resolution is then translated into a possible set of resolution parameter values. In the example above the resolution parameter was either high, medium or low. The multipath environment is an adapted based on the change of the value of the resolution parameter.

When the adaptation of the at least one path is initiated, this can mean that a policy controller or policy server is informed which is configured to control the transmission policy of the video streams in the multipath environment. This policy server is then informed about the estimated resolution or the determined change of the resolution and the at least one path in the multipath environment is adapted based on the feedback received from the policy server.

When it is determined that the resolution used in the video stream during the transmission has decreased over time, an opening of an additional path in the multipath environment may be initiated. Furthermore it is possible that when it is determined that that the resolution used individual stream during the transmission has decreased, a closing of an existing path in the multipath environment is initiated.

The video segment upon which the estimation of the resolution is based can comprise the payload data transmitted over the at least one path in a first transmission direction between two consecutive requests transmitted in the opposite direction requesting to receive the video stream.

When it is determined that the resolution used in the video stream during transmission remains substantially the same, it can be determined that the resolution is in a lower resolution range of a known possible resolution range. However when it is determined that the resolution of the video segments changes by more than a defined threshold, it is determined that the resolution is in a higher resolution range of the known possible resolution range.

It is possible to identify the encrypted media stream as being a video stream based on a name indication present in a message exchanged between the video server, here the media streaming entity and the media receiving entity, here the customer premises equipment wherein the name indication allows video server to be identified.

The resolution may be estimated based on a machine learning algorithm which is embedded in a deep packet inspection module which comprises a first clustering part in which different possible resolutions of the media stream are determined based on test data and which comprises a second classification part in which the video streams are classified in one of the possible resolutions.

The invention described above allows a network to detect the video resolution employed in a user's video session in case of encrypted traffic and allows a network to open or close multipath legs based on the estimated resolution.

A new interface is provided between the HAG 100 and the Policy server 200 which allows the HAG to report its capabilities and the estimated resolution parameter. A new interface is provided between the HCPE 10 and the Policy server 200 which allows the HCPE to report its capabilities and the estimated QoE.

The above described method (of the resolution video detection) allows the detection of the quality of the video according to the deviation against the mean of the average size of the video segments and it works even when the video traffic is encrypted. The quality/resolution of the video is detected analyzing the segment size of each video segment.

The method (opening or closing a multipath leg based on resolution parameter), allows better usage of the Radio Bearer. In multipath scenarios, Radio Bearers are not assigned if the QoE of a video session is good from end user point of view. Streaming Radio Access Bearer are assigned only when the QoE of the user is bad (lower than expected quality defined by operators) or when a user has suffered more than one change in the quality of the video. LTE path is opened only when the quality of the video is not fulfilling the end user requirements.

The invention claimed is:

1. A method for controlling, by a path control entity, at least one path in a multipath environment, the at least one path being used for transmitting an encrypted video stream comprising a sequence of video segments, the sequence of video segments including a first video segment and a second video segment, the method comprising:
   receiving a content request using a multipath Transmission Control Protocol (TCP), wherein the request was transmitted by a user device;
   transmitting the content request towards a first server using a non-multipath TCP;
   receiving a first video segment using the non-multipath TCP, wherein the first video segment was transmitted by the first server;
   based at least on receiving the first video segment, obtaining first path information indicating a first path which is selected from a plurality of paths;
   transmitting towards the user device the first video segment using the multipath TCP and the selected first path;
   after transmitting the first video segment, receiving a second video segment using the non-multipath TCP, wherein the second video segment was transmitted by the first server;
   analyzing the second video segment, thereby obtaining a target video quality;
   estimating a quality used in the video stream;
   determining that the quality used in the video stream has changed;
   after determining that the quality used in the video stream has changed, obtaining second path information indicating the first path and a second path which are selected from the plurality of paths; and
   initiating transmission of the video stream via the first and second paths.

2. The method according to claim 1, further comprising:
   determining a change in a size of one or more video segments in the video stream over time, wherein the quality used in the video stream is estimated based on the determined change of the size.

3. The method according to claim 1, comprising:
informing a policy controller configured to control a transmission policy of the video stream in the multipath environment of the determined change in the quality; and
determining which one or more of the plurality of paths to use for transmission of the video stream based on a feedback received from the policy controller.

4. The method according to claim 1, wherein determining that the quality used in the video stream has changed comprises determining that the quality used in the video stream during the transmission has decreased.

5. The method according to claim 2, wherein
determining the change of the size comprises determining an average size of a defined number of a group of video segments in the video stream and determining a mean value of the average size of the defined number of the group of video segments, and
determining which one or more of the plurality of paths to use for transmission of the video stream based on whether a deviation of the mean value is larger than a threshold value.

6. The method according to claim 1, wherein
the video segments comprise payload data transmitted over at least one path in a first transmission direction,
the payload data is transmitted between two consecutive requests requesting to receive the video stream, and
the two consecutive requests are transmitted in a direction opposite to the first transmission direction.

7. The method according to claim 1, wherein, when it is determined that the quality used in the video stream during the transmission remains substantially the same, it is determined that the quality is in a lower quality range of a known possible quality range, and wherein, when it is determined that the quality changes by more than a defined threshold, it is determined that the quality is in a higher quality range of the known possible quality range.

8. The method according to claim 1, wherein the encrypted video stream is identified as being a video stream based on a name indication present in a message exchanged between a video streaming entity and a video receiving entity, the name indication allowing the video streaming entity to be identified.

9. The method according to claim 1, wherein the quality is estimated based on a Machine Learning algorithm embedded in a Deep Packet Inspection module which comprises a first clustering part in which different possible qualities of the video stream are determined based on test data and comprises a second classification part in which the video stream is classified in one of the possible qualities.

10. The method of claim 1, wherein
the target video quality is associated with a first value,
the estimated quality is associated with a second value, and
determining whether the quality used in the video stream has changed comprises determining whether the difference between the first and second values is greater than a threshold value.

11. The method of claim 1, wherein
in case a constant bit rate scheme is used for transmitting the encrypted video stream, the quality used in the video stream is estimated based on a first size of a first video segment included in the video stream and a second size of a second video segment included in the video stream, and
in case a variable bit rate scheme is used for transmitting the encrypted video stream, the quality used in the video stream is estimated based on a deviation of the first video segment with respect to other video segments included in the video stream.

12. A path control entity configured to control at least one path in a multipath environment, the at least one path being used for transmitting an encrypted video stream comprising a sequence of video segments, the sequence of video segments including a first video segment and a second video segment, the path control entity comprising a memory and at least one processing unit, the memory containing instructions executable by said at least one processing unit, wherein the path control entity is operative to:
receive a content request using a multipath Transmission Control Protocol (TCP), wherein the request was transmitted by a user device;
transmit the content request towards a first server using a non-multipath TCP;
receive a first video segment using the non-multipath TCP, wherein the first video segment was transmitted by the first server;
based at least on receiving the first video segment, obtain first path information indicating a first path which is selected from a plurality of paths;
transmit towards the user device the first video segment using the multipath TCP and the selected first path;
after transmitting the first video segment, receive a second video segment using the non-multipath TCP, wherein the second video segment was transmitted by the first server;
analyzing the second video segment, thereby obtaining a target video quality;
estimate a quality used in the video stream;
determine that the quality used in the video stream has changed;
after determining that the quality used in the video stream has changed, obtain second path information indicating the first path and a second path which are selected from the plurality of paths; and
initiate transmission of the video stream via the first and second paths.

13. The path control entity according to claim 12, further being operative to:
determine a change in a size of one or more video segments in the video stream over time, wherein the quality used in the video stream is estimated based on the determined change of the size.

14. The path control entity according to claim 12, wherein the path control entity is configured to:
inform a policy controller configured to control a transmission policy of the video stream in the multipath environment of the determined change in the quality; and
determine which one or more of the plurality of paths to use for transmission of the video stream based on a feedback received from the policy controller.

15. The path control entity according to claim 12, wherein determining that the quality used in the video stream has changed comprises determining that the quality used in the video stream during the transmission has decreased.

16. The path control entity according to claim 13, wherein
determining the change of the size comprises determining an average size of a defined number of a group of video segments in the video stream and to determine a mean value of the average size of the defined number of the group of video segments, and determining which one or more of the plurality of paths to use for transmission of the video stream based on whether a deviation of the mean value is larger than a threshold value.

17. The path control entity according to claim 12, wherein the path control entity is operative, when the quality used in the video stream during the transmission remains substantially the same, to determine that the quality is in a lower quality range of a known possible quality range, and when the quality changes by more than a defined threshold, the path control entity is operative to determine that the quality is in a higher quality range of the known possible quality range.

18. The path control entity according to claim 12, wherein the path control entity is operative to estimate the quality based on a Machine Learning algorithm embedded in a Deep Packet Inspection module which comprises a first clustering part in which different possible qualities of the video stream are determined based on test data and comprises a second classification part in which the video stream is classified in one of the possible qualities.

19. The path control entity according to claim 12, wherein the path control entity is a hybrid access gateway or a policy controller located in a hybrid access broadband network.

20. A computer program product comprising a non-transitory computer readable medium storing a computer program comprising program code to be executed by at least one processing unit of a path control entity, wherein execution of the program code causes the at least one processor to execute a method for controlling, by a path control entity, at least one path in a multipath environment, the at least one path being used for transmitting an encrypted video stream comprising a sequence of video segments, the sequence of video segments including a first video segment and a second video segment, the method comprising:

receiving a content request using a multipath Transmission Control Protocol (TCP), wherein the request was transmitted by a user device;

transmitting the content request towards a first server using a non-multipath TCP;

receiving a first video segment using the non-multipath TCP, wherein the first video segment was transmitted by the first server;

based at least on receiving the first video segment, obtaining first path information indicating a first path which is selected from a plurality of paths;

transmitting towards the user device the first video segment using the multipath TCP and the selected first path;

after transmitting the first video segment, receiving a second video segment using the non-multipath TCP, wherein the second video segment was transmitted by the first server;

analyzing the second video segment, thereby obtaining a target video quality;

estimating a quality used in the video stream;

determining that the quality used in the video stream has changed;

after determining that the quality used in the video stream has changed, obtaining second path information indicating the first path and a second path which are selected from the plurality of paths; and initiating transmission of the video stream via the first and second paths.

* * * * *